March 22, 1949. O. M. BERG 2,465,054
CLUTCH OPERATING MECHANISM
Filed May 11, 1945 2 Sheets-Sheet 1

Inventor
O. Magness Berg.
By
E. V. Hardway,
Attorney

March 22, 1949. O. M. BERG 2,465,054
CLUTCH OPERATING MECHANISM

Filed May 11, 1945 2 Sheets-Sheet 2

Inventor
O. Magners Berg

By
E. V. Hardway,
Attorney

Patented Mar. 22, 1949

2,465,054

UNITED STATES PATENT OFFICE 2,465,054

CLUTCH OPERATING MECHANISM

O. Magness Berg, Houston, Tex.

Application May 11, 1945, Serial No. 593,110

1 Claim. (Cl. 192—94)

This invention relates to a clutch.

An object of the invention is to provide a clutch for connecting a driving and a driven member and which may be easily and quickly disengaged.

Another object of the invention is to provide a clutch of the character described provided with novel means for disengaging the driving clutch member from the driven clutch member.

A further object of the invention is to provide a clutch wherein means are provided for holding the driving member in engagement with the driven member and wherein, upon release of the holding means the driving member will be automatically disengaged from the driven member without the use of an interposed coil spring commonly used for disengaging the clutch.

With the above and other objects in view the invention has particular relation to certain novel features of construction, operation and arrangement of parts, an example of which is given in this specification and illustrated in the accompanying drawings wherein.

Figure 1:
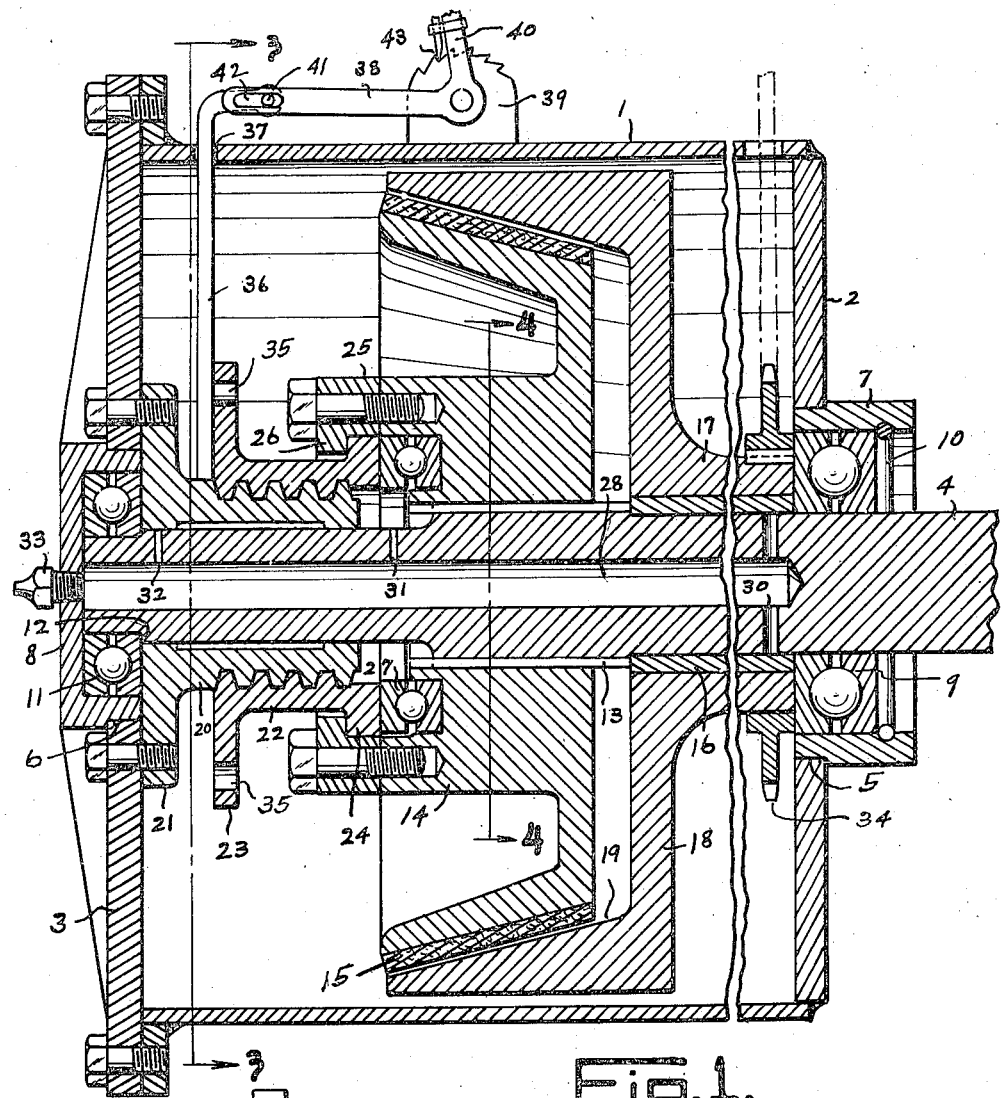
Figure 1 shows a longitudinal, sectional view of the clutch.
Figure 2:
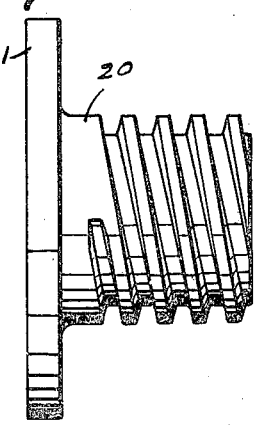
Figure 2 shows an elevational view of the clutch release pin.

Referring now more particularly to the drawings, the numeral 1 designates the clutch case having an end plate 2, preferably, welded thereto and also having an end plate 3 which is preferably bolted thereto for convenience in assembly.

The numeral 4 designates a driving shaft which extends axially through the case.

The end plates 2 and 3 have the circular openings 5 and 6 therethrough. Fitted and secured within the opening 5 there is a bearing housing 7 and fitted and secured in the opening 6 there is a closure cap 8.

Within the housing 7 and surrounding the shaft 4 is a bearing assembly 9 which is locked in assembled relation in the housing by the lockring 10 and enclosed within the cap 8 there is a bearing assembly 11.

The shaft 4 is fitted through these bearing assemblies with its inner end abutting the cap 8 and reduced forming an external shoulder 12 which clamps the bearing assembly 11 between it and the cap 8.

A section of the shaft 4 within the housing is provided with the external, longitudinal splines 13 on which the driving clutch member 14 is splined. As illustrated the member 14 is a cone clutch member provided with a conventional friction surface 15.

Between the bearing assembly 9 and the opposing ends of the splines 13 and fitted around the shaft 4 there is a bushing 16 on which the hub 17 of the driven clutch member 18 is shrunk so as to rotate with said bushing.

As will be noted from an inspection of Figure 1, the shaft 4 extends axially through said clutch members.

The driven clutch member 18 is formed with the flared friction surface 19 which has a pitch corresponding to the taper of the friction surface of the driving clutch member 14.

The numeral 20 designates an outwardly and coarsely threaded pin having a base flange 21 which surrounds and is concentric with, the opening 6 and which is bolted to the end plate 3. This pin is tubular and the shaft 4 is fitted through it, as shown in Figure 1.

Threaded onto the pin 20 there is an internally and coarsely threaded actuating sleeve 22 having the external outer end flange 23 and the external inner end flange 24. The actuating sleeve 22 has a swivelling connection with the driving clutch member 14 being connected thereto by a ring 25 which is bolted to said clutch member and which has an overhanging flange 26 which engages the flange 24, as shown in Figure 1. Between the inner end of the actuating sleeve 22 and the clutch member 14 there is a bearing assembly 27 which is countersunk into said driving clutch member, as shown in Figure 1.

The inner end of the shaft 4 has a deep axial channel 28 to be filled with a lubricant and said lubricant may reach the moving parts through the radial channels 30, 31 and 32 and the channel may be kept filled with a lubricant supplied through the fitting 33 which is screwed into the cap 8.

The driven clutch member 17 has a power take-off which, in the present illustration, comprises a sprocket wheel 34, splined onto the hub and over which a suitable sprocket chain, shown in dotted lines in Figure 1, operates.

The flange 23 is provided with the marginal perforations 35. There is a clutch actuating bar 36 which works through a slot 37 in the transmission case and whose inner end is provided with a stud 37 which may be engaged in a selected perforation 35 so that the actuating sleeve 22 may be turned thereby.

The bar 36 may be actuated manually or by means of an actuating lever 38, as shown in Figure 1. This lever is pivoted in any suitable manner. As shown, it is pivoted to the lug 39 secured to the case 1 and is provided with a handle 40 for actuating the same. In the present illustration the outer end of the bar 36 is overturned and is provided within a laterally extended pin 41 which works through the oblong slot 42 in the free end of the lever 38. The bar 36 may thereby be moved inwardly or outwardly to correspondingly turn the sleeve 22 by manipulating the lever 38 and said lever, and bar 36, may be secured in any selected position by means of the rack-and-dog arrangement 43.

Figure 3:
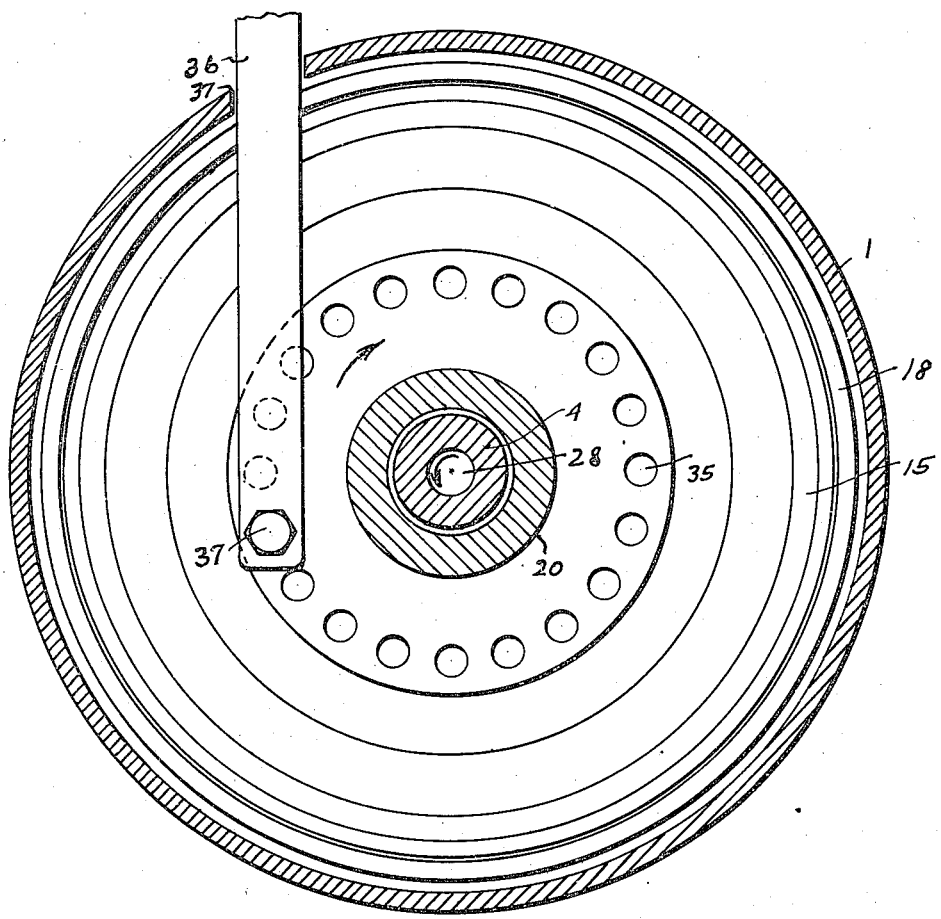
Figure 3 shows a cross, sectional view taken on the line 3—3 of Figure 1.
Figure 4:
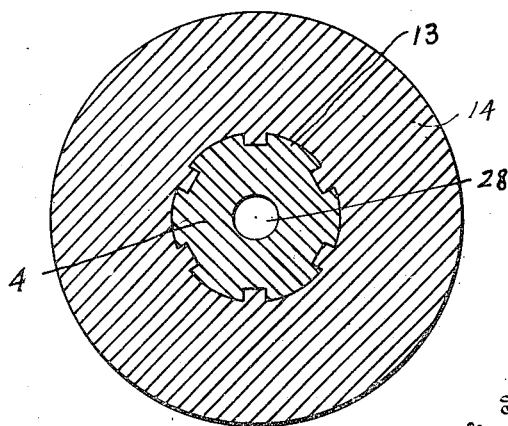
Figure 4 shows a cross, sectional view taken on the line 4—4 of Figure 1.

In the present illustration the actuting sleeve may be rotated in the direction indicated by the arrow in Figure 3 and this will operate through the threaded connection between said sleeve and the pin 20 to force the driving clutch member 14 into engagement with the driven clutch member 18 so as to drive the latter and the power take-off.

In the present illustration the driving shaft 4 rotates in the direction indicated by the arrow in Figure 3 and upon release of the bar 36 the actuating sleeve 22 will be turned in the reversed direction and will automatically cause the disengagement of the clutch without the necessity of the usual coil spring interposed between said clutch members. Of course, the cone clutch member 14 may be positively disengaged from the clutch member 14 by the positive actuation of the bar 36 inwardly to cause the backward rotation of the actuating sleeve 22 on the pin 20.

What I claim is:

A clutch assembly comprising, a clutch case, end plates secured to the case, a driving shaft extending axially through the case, a driven clutch member within the case mounted on the shaft to rotate independently thereof and having a power take-off, a driving clutch member in the case splined on the shaft and adapted to be frictionally engaged with, and to be released from, the driven clutch member, and externally threaded tubular pin through which the shaft extends, said pin being fixed to one of said end plates, an internally threaded sleeve threaded onto said pin and one end of which is adjacent the driving clutch member and is formed with an external annular flange, a ring bolted to the driving clutch member and having an internal annular flange which engages with said external annular flange to form a swivelling connection between the sleeve and the driving clutch member and means accessible to an operator and working through said case and connected to the sleeve whereby the sleeve may be rotated to effect longitudinal movement of the driving clutch member relative to the shaft to engage or disengage the clutch.

O. MAGNESS BERG.

REFERENCES CITED

The following references are of record in the file of this patent:

UNITED STATES PATENTS

| Number | Name | Date |
|---|---|---|
| 1,482,312 | Mason | Jan. 29, 1924 |
| 1,631,392 | Wright | June 7, 1927 |
| 1,773,509 | Barzen | Aug. 19, 1930 |
| 1,885,827 | Hottman, Jr. | Nov. 1, 1932 |
| 1,962,715 | Heilman | June 12, 1934 |
| 2,263,156 | Abel | Nov. 18, 1941 |
| 2,413,081 | Shaeffer | Dec. 24, 1946 |

FOREIGN PATENTS

| Number | Country | Date |
|---|---|---|
| 203,631 | Great Britain | 1923 |